US012659866B2

(12) United States Patent
Polaganga et al.

(10) Patent No.:  US 12,659,866 B2
(45) Date of Patent:      Jun. 16, 2026

(54) SYSTEM AND METHOD FOR POWER MANAGEMENT VIA NETWORK TRANSMISSION

(71) Applicant: T-Mobile Innovations LLC, Overland Park, KS (US)

(72) Inventors: Roopesh Kumar Polaganga, Bothell, WA (US); Kurt Landuyt, Parkville, MO (US)

(73) Assignee: T-Mobile Innovations LLC

(*) Notice: Subject to any disclaimer, the term of this patent is extended or adjusted under 35 U.S.C. 154(b) by 358 days.

(21) Appl. No.: 18/341,961

(22) Filed: Jun. 27, 2023

(65) Prior Publication Data

US 2025/0008442 A1     Jan. 2, 2025

(51) Int. Cl.
*H04W 52/02* (2009.01)

(52) U.S. Cl.
CPC .............................. *H04W 52/0248* (2013.01)

(58) Field of Classification Search
CPC ......... H04W 52/0248; H04W 52/0225; H04W 52/0209; H04W 52/02; H04W 52/00
See application file for complete search history.

(56) References Cited

U.S. PATENT DOCUMENTS

| | | | |
|---|---|---|---|
| 8,116,761 B1 * | 2/2012 | Singh | H04W 68/02 |
| | | | 455/445 |
| 11,553,414 B1 | 1/2023 | Abedini et al. | |
| 2016/0323826 A1 * | 11/2016 | Xie | H04W 52/0251 |
| 2017/0202052 A1 * | 7/2017 | Xu | H04W 72/541 |
| 2022/0417875 A1 | 12/2022 | Abedini et al. | |
| 2023/0164680 A1 * | 5/2023 | Hao | H04W 48/08 |

* cited by examiner

*Primary Examiner* — Jamal Javaid
(74) *Attorney, Agent, or Firm* — Jones Burke PLLC

(57)           ABSTRACT

Systems, methods, and devices for scheduling network transmissions perform and/or comprise: setting a utilization threshold for an access node; monitoring a utilization parameter for the access node; and in response to a determination that the utilization parameter is below the utilization threshold, causing the access node to transmit data signals in a synchronization signal block of a downlink transmission frame and to not transmit data signals in blocks of the downlink transmission frame other than the synchronization signal block.

18 Claims, 5 Drawing Sheets

200

SYSTEM AND METHOD FOR POWER MANAGEMENT VIA NETWORK TRANSMISSION

TECHNICAL BACKGROUND

Wireless telecommunications are generally provided via a plurality of geographically overlapping networks. From an infrastructure standpoint, a wireless device ("user equipment" or UE) may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; 5G RATs such as new radio (NR), or newer RATs such as 6G.

An access node may perform bidirectional communication with a wireless device using either a Frequency Division Duplexing (FDD) or Time Division Duplexing (TDD) scheme. In FDD communication, downlink communications (i.e., communications from the access node to the wireless device) and uplink communications (i.e., communications from the wireless device to the access node) may occur simultaneously but are separated in the frequency domain, meaning that the downlink frequencies and the uplink frequencies are different. In TDD communication, downlink communications and uplink communications use the same frequencies but are separated in the time domain, meaning that uplink and downlink communications occur alternatingly according to a set schedule.

In both FDD and TDD communication, a given access node communicates with a plurality of connected wireless devices using a series of signals over a range of frequency resources. In the time domain, the signals may be divided into a series of frames of a particular duration (e.g., 10 milliseconds (ms)), each of which includes a number of subframes (e.g., ten subframes), which in turn includes a number of slots (e.g., $2^n$ slots, where n ranges from zero to six), which in turn include a number of symbols (e.g., twelve or fourteen symbols). In each frame, the first slot (or series of slots) is used to broadcast a synchronization signal in order to permit wireless devices in the area to discover the access node, to perform synchronization, and so on. These signals are transmitted in synchronization signal blocks (SSBs), which generally occupy a subset of physical resource blocks (PRBs) in the frequency domain, such as 20 PRBs centered in the frequency range of the communication band, and a subset of symbols in the time domain, such as four symbols per SSB. The remaining slots in the frame are used to transmit and/or receive data and/or control communications, typically using all PRBs in the frequency range of the communication band.

OVERVIEW

Various aspects of the present disclosure relate to systems and methods of scheduling network transmissions (e.g., by prioritizing data communications in a synchronization signal block slot) in a telecommunications network.

In one exemplary aspect of the present disclosure, a method of scheduling network transmissions comprises setting a utilization threshold for an access node; monitoring a utilization parameter for the access node; and in response to a determination that the utilization parameter is below the utilization threshold, causing the access node to transmit data signals in a synchronization signal block of a downlink transmission frame and to not transmit data signals in blocks of the downlink transmission frame other than the synchronization signal block.

In another exemplary aspect of the present disclosure, a system for scheduling network transmissions an access node; and at least one electronic processor operatively connected to the access node and configured to perform operations including: in response to a determination that a power saving mode is active for the access node, monitoring a utilization parameter for the access node, and in response to a determination that the utilization parameter is below a utilization threshold, causing the access node to transmit data signals in a synchronization signal block of a downlink transmission frame and to not transmit data signals in blocks of the downlink transmission frame other than the synchronization signal block.

In yet another exemplary aspect of the present disclosure, non-transitory computer-readable medium stores instructions that, when executed by a processor of a processing node, cause the processing node to perform operations comprising setting a user threshold and a resource utilization threshold for an access node; monitoring a user parameter and a resource utilization parameter for the access node; and in response to one or both of a determination that the user parameter is below the user threshold and a determination that the resource utilization parameter is below the resource utilization threshold, causing the access node to transmit data signals in a synchronization signal block of a downlink transmission frame and to not transmit data signals in blocks of the downlink transmission frame other than the synchronization signal block.

In this manner, these and other aspects of the present disclosure provide for improvements in at least the technical field of telecommunications, as well as the related technical fields of network management, device management, network security, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
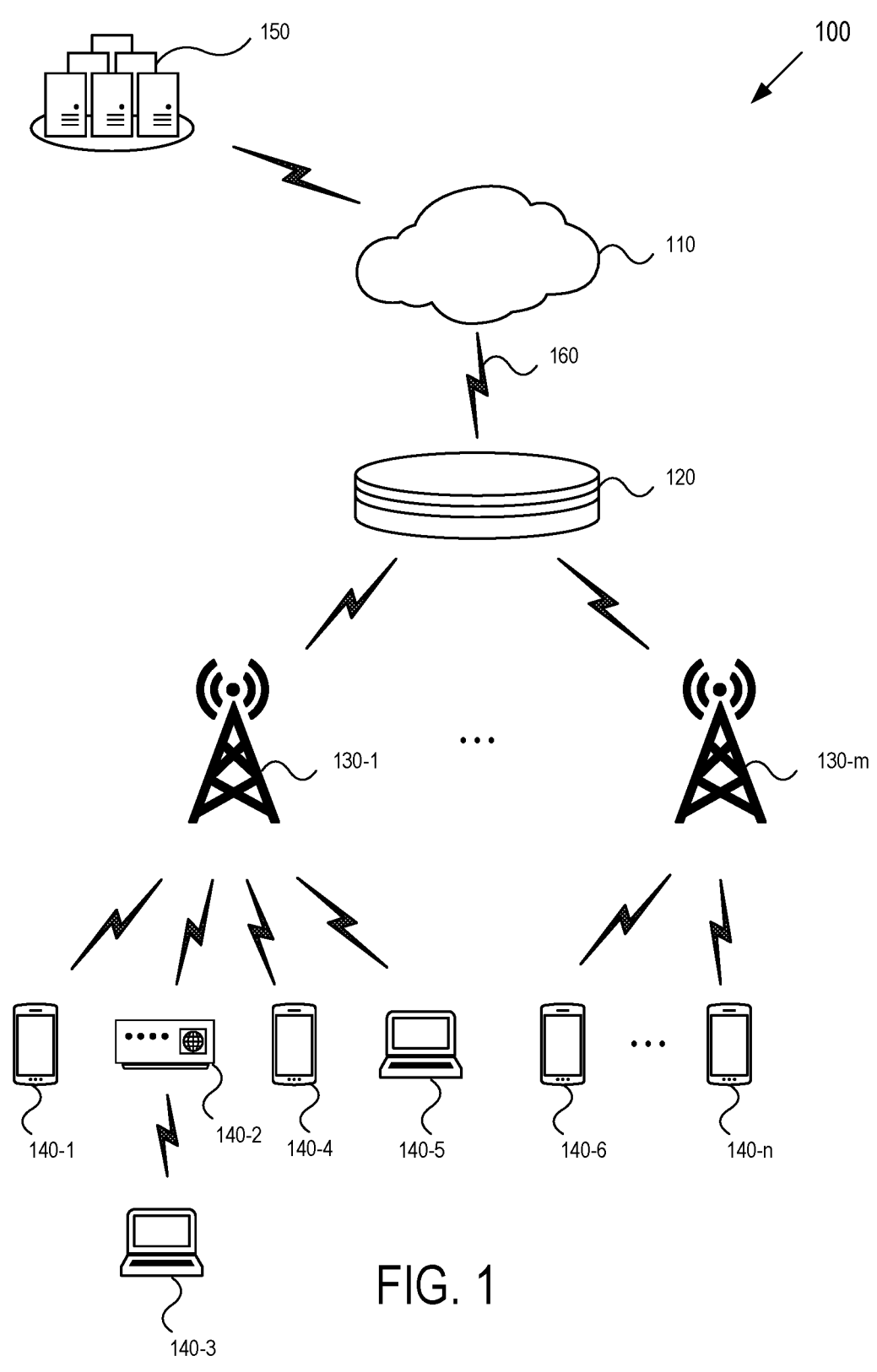
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include an electronic processor included in the access node and/or an electronic processor included in any controller node in the wireless network that is coupled to the access node.

As noted above, duplex communication between wireless devices and an access node, whether using FDD or TDD, takes place using a plurality of sequential data frames. The first slot in each frame (or, for certain TDD implementations, the first few slots) is used to broadcast a synchronization signal in order to facilitate synchronization between the wireless device and the access node, to broadcast the presence of the access node and thus permit discovery, to determine parameters for beam management, and so on. Other slots are typically used to perform data communication. Each SSB occupies a set number of resources in the frequency domain within the Physical Downlink Shared Channel (PDSCH), regardless of the total width of the band. In order to increase overall throughput, it is possible to utilize frequency resources above and below the SSB resources to transmit data. For example, in a case where a particular band occupies 106 PRBs in the frequency domain, it is possible to transmit data using PRBs indexed 0 to 42 and to 63 to 105 (where the SSBs occupy the 20 central PRBs) rather than leaving these frequency resources blank during the SSB.

The SSB slots must be transmitted because otherwise it would be difficult or impossible for wireless devices to perform cell acquisition. However, even when scheduling data transmissions in otherwise-unoccupied frequency resources during the SSB, the overall scheduling of the data transmissions throughout the rest of the frame are generally not changed. During time periods in which there is a low utilization of resources (e.g., during the middle of the night and/or at times when there are few users actively connected to the access node), the access node must still continue to power all of its antenna elements throughout the entirety of the frame. This may result in excessive power consumption. Therefore, there exists a need for scheduling data transmissions so as to reduce power consumption and/or associated costs. Accordingly, the present disclosure provides for systems, methods, applications, and devices to prioritize data transmissions in SSB slots enabling a reduction in the overall power-on time of transmission in other slots and providing power savings and a reduction in operating expense.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, a desktop computer with wireless communication capabilities, and so on. The term "wireless device" is used interchangeably with the term "wireless communication device" herein.

In accordance with various aspects of the present disclosure, a cellular or wireless network may be provided by an access node. While examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB, while still others may communicate with a Non-Terrestrial Network (NTN) satellite. Additionally, for purposes of illustration and explanation, various portions of this detailed description refer to implementations in a network a 5G NR RAT; however, the present disclosure is not so limited. The systems and methods described herein may be implemented in a network using any RAT, including further extensions or updated implementations of 5G (e.g., 5G Advanced) or newer generations of RATs such as 6G.

FIG. 1 illustrates an exemplary system 100 for use with various aspects of the present disclosure. In practical implementations the system 100 may correspond to any RAT or combinations of RATs, including but not limited to 3G RATs such as GSM, UMTS, CDMA, etc.; 4G RATs such as WiMAX, LTE, etc.; 5G RATs such as NR; NTN RATs; and further extensions or updated implementations of the same. As illustrated, the system 100 includes a cloud platform 110, a core network 120, and a plurality of access nodes 130-1 to 130-*m* (collectively referred to as access nodes 130), and a plurality of wireless devices 140-1 to 140-*n* (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an LTE cloud platform, an NR cloud platform, an NTN cloud platform, or a combination thereof may perform processing and forward results to the computing systems and devices 150 and/or the wireless devices 140. The core network 120, which may be an LTE core network, a 5G Core Network (5GCN), an NTN, or combinations thereof, connects with the cloud platform 110 and the access nodes 130. Subsets of the access nodes 130 may be respectively configured to provide service in different areas, on different bands, for different RATs, and so on. FIG. 1 illustrates a situation in which the system 100 is operated by a single network operator. In many geographical areas, multiple access nodes 130 provide coverage that may overlap.

The access nodes 130 communicate with the core network 120 via one or more communication links, each of which may be a direct link (e.g., an N2 link, an N3 link, or the like), a wireless link (e.g., a satellite link), or combinations thereof. The access nodes 130 may further communicate with one another and/or with additional access nodes via a direct link, a wireless link, or combinations thereof. A scheduling entity may be located within the access nodes 130 and/or the core network 120, and may be configured to accept, deny, and route connection requests and manage communication sessions, for example to enforce a selected network topology. The access nodes 130 may be any network node configured to provide communications between the connected wireless devices 140 and the core network 120 and cloud platform 110, including standard access nodes; short range, lower power, small access nodes; or long range non-terrestrial access nodes. As examples of a standard access node, the access nodes 130 may be a macrocell access node, a base transceiver station, a radio base station, a gNodeB in 5G networks, an eNodeB in 4G/LTE networks, or the like, including combinations thereof. In one particular example, the access nodes 130 may be a macrocell access node in which a range of its coverage area is from approximately five to thirty-five kilometers (km) and in which the output power is in the tens of watts (W). As examples of a small access node, the access nodes 130 may be a microcell access node, a picocell access node, a femtocell access node, or the like, including a home gNodeB or a home eNodeB. As examples of a non-terrestrial access node, the access nodes 130 may be a geosynchronous equatorial orbit (GE) satellite, a medium earth orbit (MEO) satellite, a low earth orbit (LEO) satellite, or the like.

An access node 130 may comprise one or more electronic processors and associated circuitry to execute or direct the execution of computer-readable instructions such as those described herein. In so doing, the access node 130 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 130 can receive instructions and other input at a user interface.

The wireless devices 140 are devices configured with appropriate technologies for connecting to the cloud platform 110. The wireless devices 140 may be or include mobile communication devices such as smartphones, laptop computers, tablet computers, desktop computers with wireless communication capabilities, and the like; vehicles such as cars, trucks, and the like; connectivity devices such as modems, routers, and the like, and/or Internet-of-Things (IoT) devices such as smart-home sensors or industrial sensors, and the like. A wireless device 140 may include one or more electronic processors and associated circuitry to execute or direct the execution of computer-readable instructions such as those described herein. The wireless device 140 may further include a memory, wireless communication circuitry, and other components. While the present disclosure is presented mainly with regard to 3GPP wireless devices communicating over a radio access network (RAN), in practical implementations one or more of the access nodes 130 and/or wireless devices 140 may be configured to include other types of access mechanisms, including by non-3GPP access nodes and/or non-RAN access.

In general, the network provided by the system 100 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The network can be capable of carrying data, for example to support voice, push-to-talk (PTT), broadcast video, and/or data communications by the wireless devices 140. Wireless network protocols can comprise Multimedia Broadcast Multicast Services (MBMS), CDMA, 1×RTT, GSM, UMTS, High Speed Packet Access (HSPA), Evolution-Data Optimised (EV-DO), EV-DO rev. A, 3GPP LTE, WiMAX, 4G including LTE Advanced and the like, 5G including 5G NR or 5G Advanced, or combinations thereof, and 6G. Wired network protocols that may be utilized by the network comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The network may also comprise additional base stations, controller nodes, telephony switches, internet routers, network gateways, computer systems, communication links, other types of communication equipment, and combinations thereof.

The communication links 160 connecting various components of the system 100 may respectively use various communication media, such as air, space, metal, optical fiber, other signal propagation paths, and combinations thereof. The communication links may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G Advanced, NTN, 6G, or combinations thereof. The communication links may respectively be a direct link or might include various equipment, intermediate components, systems, and networks. The communication links may comprise many different signals sharing the same link.

In a 5G implementation, the cloud platform 110, the core network 120, and/or the access nodes 130 may collectively implement several control plane network functions (NFs)

and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a User Plane Function (UPF). Control plane NFs can provide one or more NFs based on a request-response or subscribe-notify model. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the core network 120. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the core network 120, thereby terminating RAN control plane and UE traffic originating on either the N1 or N2 reference interface. In the core network 120, the functionality of the 4G Mobility Management Entity (MME) is decomposed into the AMF and the SMF. The AMF receives all connection and session related information from the UE using N1 and N2 interfaces, and is responsible for handling connection and mobility management tasks.

A Unified Data Repository (UDR) may also be present. The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QOS) handling, etc. When compared with 4G EPC, the functions of the UPF may resemble those of the SGW-U (Serving Gateway User Plane function) and PGW-U (PDN Gateway User Plane function).

In an NTN implementation, there may be a RAN serving multiple UEs by a radio frequency transmission provided by utilizing orbiting satellites that may be in communication with access nodes (e.g., some of the access nodes 130) of a terrestrial network (TN). The NTN includes NTN nodes that are not stationed on the ground as a complement to the TNs. The NTN may be one of three types of satellite-based NG-RAN architectures: transparent satellite-based NG-RAN, regenerative satellite-based NG-RAN, and multi-connectivity involving satellite-based NG-RAN. Transparent satellite-based NG-RAN implements frequency conversion and a radio frequency amplifier in both uplink and downlink directions. Several transparent satellites may be connected to the same gNB on the ground through New Radio Uplink Unicast (NR-Uu). Regenerative satellite-based NG-RAN implements regeneration of the signals received from earth. The satellite payload also provides Inter-station Signaling Links (ISL) between satellites. An ISL may be a radio interface or an optical interface that may be 3GPP or non-3GPP defined. The regenerative satellite-based NGRAN architecture may be gNB processed payload (has both gNB Centralized Unit (gNB-CU) and gNB Distributed Unit (gNB-DU)) processed payload. Multi-connectivity involving satellite-based NG-RAN applies to transparent satellites as well as regenerative satellites with gNB or gNB-DU function on board.

Other network elements may be present in the system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access node 130 and the core network 120.

Figure 2:
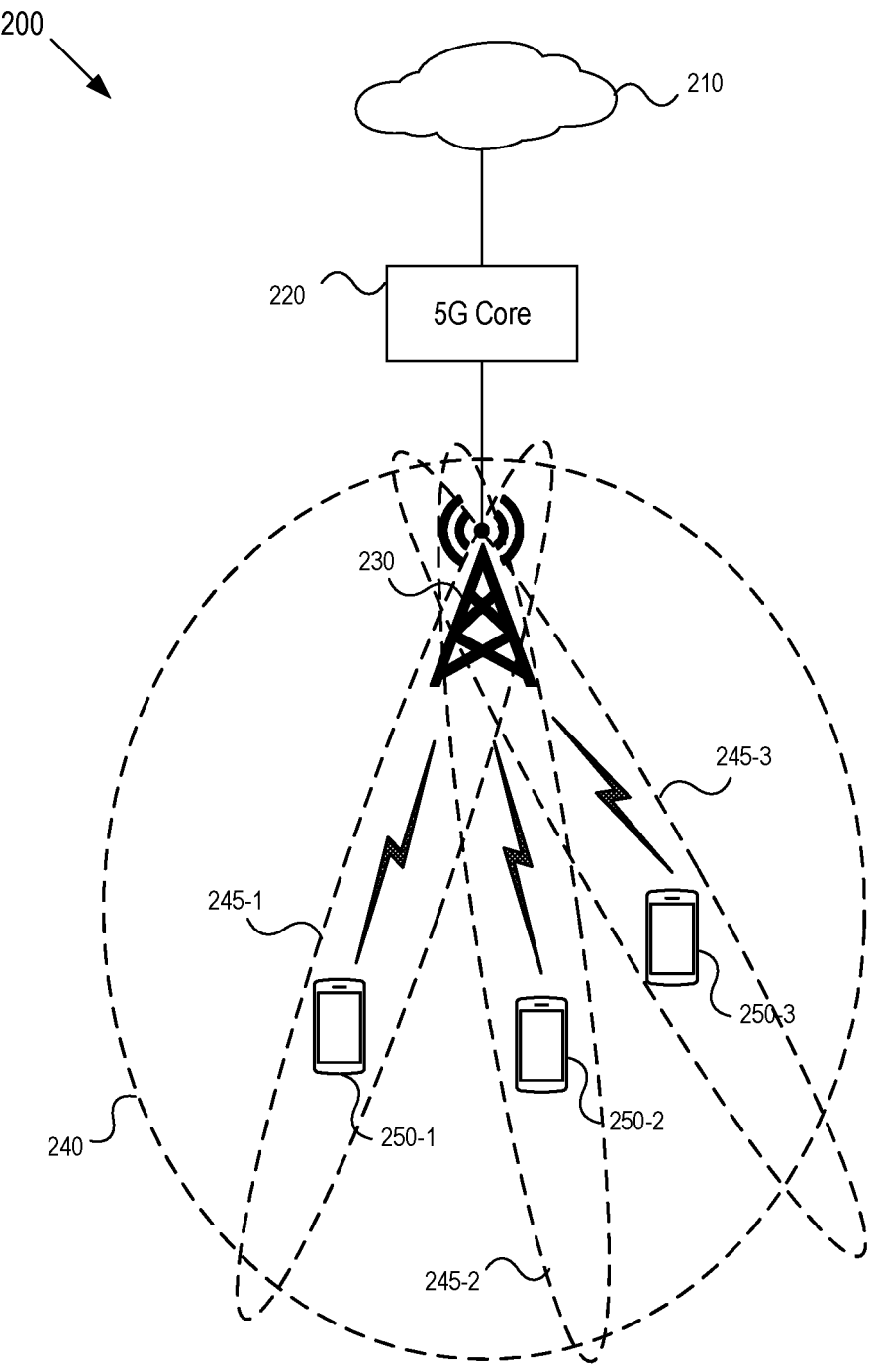
FIG. 2 illustrates an exemplary configuration of a system for wireless communication in accordance with various aspects of the present disclosure.

FIG. 2 illustrates a configuration in which a system 200 provides network coverage via an access node within a particular area. For purposes of illustration and explanation, the system 200 is illustrated as a 5G System (5GS); however, in practical implementations the system 200 may correspond to any RAT or combinations of RATs, including but not limited to 3G RATs such as GSM, UMTS, CDMA, etc.; 4G RATs such as WiMAX, LTE, etc.; 5G RATs such as NR; 6G RATs; and further extensions or updated implementations of the same.

As illustrated, the system 200 comprises a communication network 210, a 5G core 220, an access node 230, and a plurality wireless devices 250-1 to 250-3 (collectively referred to as wireless devices 250). Various components of the system 200 of FIG. 2 may correspond to components of the system 100 of FIG. 1; for example, the access node 230 may correspond to one of the access nodes 130, the wireless devices 250 may correspond to various ones of the wireless devices 140, and so on. For purposes of illustration and ease of explanation, only one access node 230 and three wireless devices 250 are shown in the system 200; however, as noted above with regard to FIG. 1, additional access nodes and/or additional or fewer wireless devices may be present in the system 200. In the illustration of FIG. 2, the access node 230 is connected to the communication network 210 via an NR path (including the 5G core 220); however, in practical implementations the access node 230 may be connected to the communication network 210 via multiple paths (e.g., using multiple RATs). The access node 230 communicates with the 5G core 220 via one or more communication links, each of which may be a direct link (e.g., an N2 link, an N3 link, or the like). The access node 230 may also communicate with additional access nodes via a direct link.

The communication network 210 can be a wired and/or wireless communication network, and can comprise processing nodes, routers, gateways, and physical and/or wireless data links for carrying data among various network elements, including combinations thereof, and can include a LAN or a WAN, and an internetwork (including the Internet). The communication network 210 can be capable of carrying data, for example to support voice, push-to-talk (PTT), broadcast video, and/or data communications by the wireless devices 250. Wireless network protocols can comprise MBMS, CDMA, 1×RTT, GSM, UMTS, HSPA, EV-DO, EV-DO rev. A, 3GPP LTE, WiMAX, 4G including LTE Advanced and the like, 5G including 5G NR or 5G Advanced, 6G or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, FDDI, and ATM. The communication network 210 may also comprise additional base stations, controller nodes, telephony switches, internet routers, network gateways, computer systems, communication links, other types of communication equipment, and combinations thereof.

The communication links connecting the access node 230 to the 5G core 220 may respectively use various communication media, such as air, space, metal, optical fiber, other signal propagation paths, and combinations thereof. The communication links may respectively be wired or wireless and use various communication protocols such as Internet, IP, LAN, optical networking, HFC, telephony, T1, other communication formats, and combinations, improvements, or variations thereof. Wireless communication links may use electromagnetic waves in the RF, microwave, IR, or other wavelength ranges, and may use a suitable communication protocol, including but not limited to MBMS, CDMA, 1×RTT, GSM, UMTS, HSPA, EV-DO, EV-DO rev. A. 3GPP LTE, WiMAX, 4G including LTE Advanced and the like, 5G including 5G NR or 5G Advanced, 6G or combinations thereof as noted above. The communication links may respectively be a direct link or might include various equipment, intermediate components, systems, and networks. The communication links may comprise many different signals sharing the same link. The communication network 210, the access node 230, and/or the 5G core 220 may collectively implement several control plane NFs and user plane NFs which are described above.

Other network elements may be present in the system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access node 230 and the communication network 210.

A scheduling entity may be located within the access node 230 and/or the 5G core 220, and may be configured to accept and deny connection requests and manage communication sessions, to allocate resources and RATs to improve overall network resource utilization and performance, to configure connected wireless devices, to determine the order and timing of transmissions, and the like. The access node 230 may be any network node configured to provide communications between the connected wireless devices 250 and the communication network 210, including standard access nodes and/or short range, lower power, small access nodes. As examples of a standard access node, the access node 230 may be a macrocell access node, a base transceiver station, a radio base station, a gNodeB in 5G networks, an eNodeB in 4G/LTE networks, or the like, including combinations thereof. In one particular example, the access node 230 may be a macrocell access node in which a range of coverage is from approximately five to thirty-five kilometers (km) and in which the output power is in the tens of watts (W). As examples of a small access node, the access node 230 may be a microcell access node, a picocell access node, a femtocell access node, or the like, including a home gNodeB or a home eNodeB.

The access node 230 can comprise one or more electronic processors and associated circuitry to execute or direct the execution of computer-readable instructions such as those described herein. In so doing, the access node 230 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 230 can receive instructions and other input at a user interface.

The access node 230 further can comprise one or more communication elements, such as one or more antennas, in order to provide communications services over a geographic area. The communication elements may include a combination of wide area (e.g., omnidirectional) and narrow (e.g., beam-forming or directional) antennas. As illustrated in FIG. 2, the access node 230 includes a wide area antenna to provide coverage in a wide coverage area 240 and three narrow antennas to provide coverage in a first narrow coverage area 245-1, a second narrow coverage area 245-2, and a third narrow coverage area 245-3. In practical implementations, the access node 230 may include a large number of narrow antennas. The narrow antennas may provide increased throughput and/or reduced latency as compared to the broad antenna(s), despite having a narrower coverage area as compared to the broad antenna(s). Individual ones of the narrow antennas may be selectively enabled or disabled depending on the number and location of connected wireless devices 250.

The access node 230 may be configured to implement systems and methods for power management by scheduling network transmissions in accordance with a scheduling entity residing therein or residing in another network device. As noted above, the access node 230 must transmit SSB slots in order to ensure that wireless devices 250 are able to perform cell acquisition. These SSB slots may be transmitted using the broad antenna in order to permit acquisition in the entirety of wide coverage area 240, which is wider than any of the narrow coverage areas 245. At times when active utilization is low (e.g., during the middle of the night and/or at times when there are few users actively connected to the access node 230), the access node 230 may be configured to realize significant energy savings and associated cost reductions, for example by prioritizing data transmissions in SSB slots. In some examples, prioritizing data transmissions in SSB slots may permit the access node 230 to power-down one or more of the narrow antennas and solely use the broad antenna for all data communications, and may be able to power-down the broad antenna for large portions of each data frame.

Figure 3A:
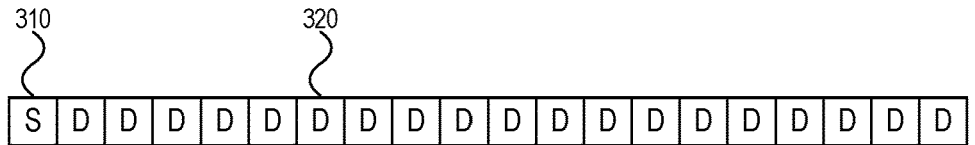
FIGS. 3A-3C respectively illustrate an exemplary FDD frame structure for wireless communication in accordance with various aspects of the present disclosure.

FIGS. 3A-3C and 4A-4C illustrate an example of downlink (DL) data frames transmitted according to a scheme which implements such prioritization for both FDD (FIGS. 3A-3C) and TDD (FIGS. 4A-4C) schemes. In FIG. 3A, a DL data frame includes a single SSB slot 310 at the beginning thereof, which is followed by a plurality (here, nineteen) of data slots 320. The DL data frame has a duration of 10 ms, and both the SSB slot 310 and the data slots 320 each include fourteen data symbols. DL data frame may exist in a 20 megahertz (MHz) bandwidth layer, such as a layer of band n71. Thus, the transmissions represented in FIG. 3A may occupy 106 PRBs of the transmitting access node. In other implementations, the DL data frame may exist in 10 MHZ, 15 MHZ, or more than 20 MHZ.

Figure 3B:
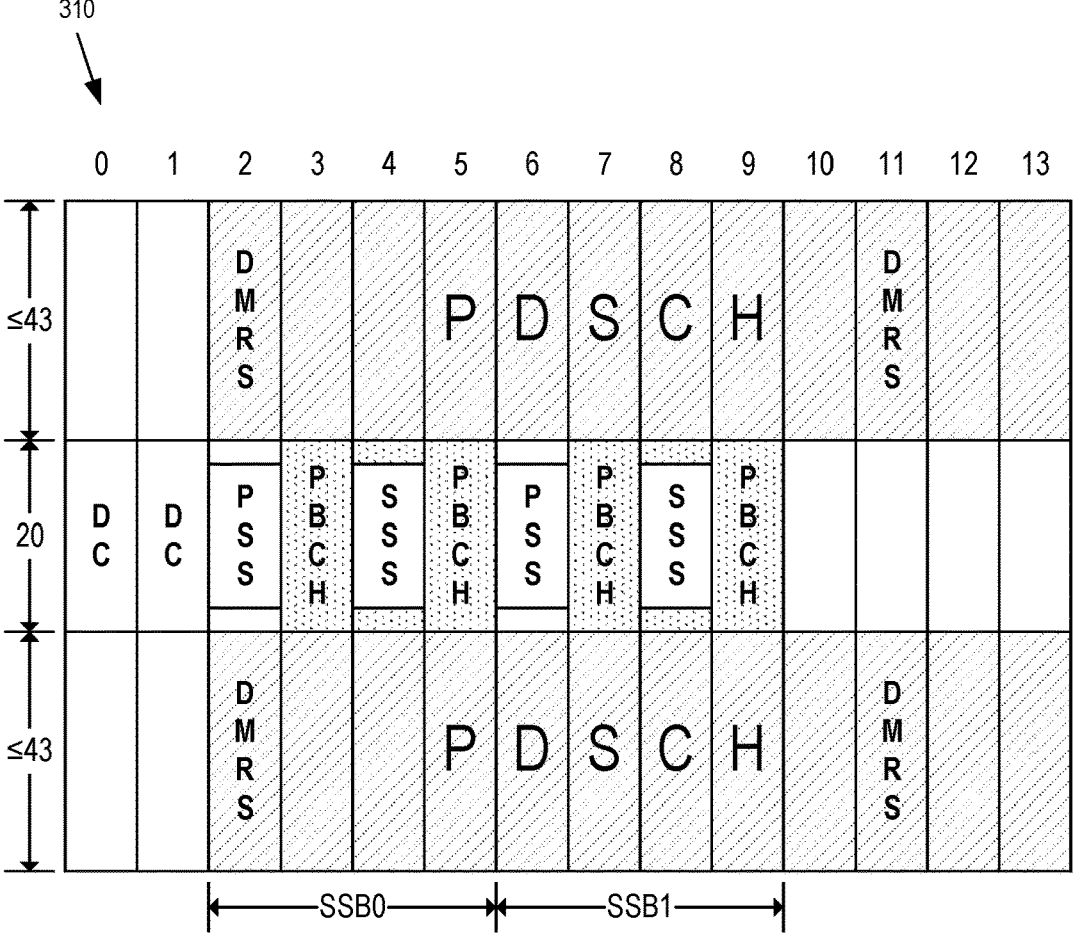
Figure 3C:
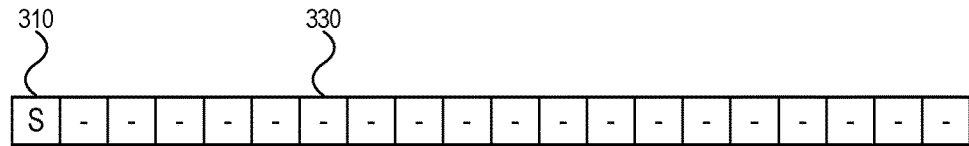

FIG. 3B illustrates the SSB slot 310 in more detail. The central 20 PRBs are used to transmit synchronization signals, and the 43 PRBs above and below the central 20 PRBs are used to transmit data (PDSCH) signals. As noted above, transmitting PDSCH signals in the SSB slot 310 provides an increase in throughput. In symbols 0 and 1, downlink control (DC) information is transmitted. The SSB slot 310 includes two SSBs, each of which occupies four symbols in the time domain and 20 PRBs in the frequency domain. Each SSB includes a primary synchronization signal (PSS) in the first symbol (2 and 6) and a secondary synchronization signal (SSS) in the third symbol (4 and 8), each of which occupy 12 PRBs in the frequency domain. Each SSB further includes a physical broadcast channel (PBCH) transmission spanning the second through fourth symbol (3-5 and 7-9), which occupies 20 PRBs in the second and fourth symbol and the remaining 8 PRBs (i.e., those PRBs not occupied by the SSS) in the third symbol. A total of 86 PRBs are available for data transmissions in symbols 2-13, which includes demodulation reference signals (DMRS) and PDSCH transmissions. In many instances when resource utilization is low, the space available for data transmissions in the SSB slot 310 (i.e., the 86 PRBs over 12 symbols) is sufficient to handle all data traffic for the access node. Thus, the access node may implement the systems and methods described in more detail below (see FIGS. 5-6) in order to schedule all data signals to be transmitted in the SSB slots 310 and not to be transmitted in any of the data slots 320. FIG. 3C illustrates the resulting DL transmission frame in which the SSB slot 310 is followed by a series of blanked slots 330 in which no data is transmitted and the associated antennas may be powered down.

Figure 4A:
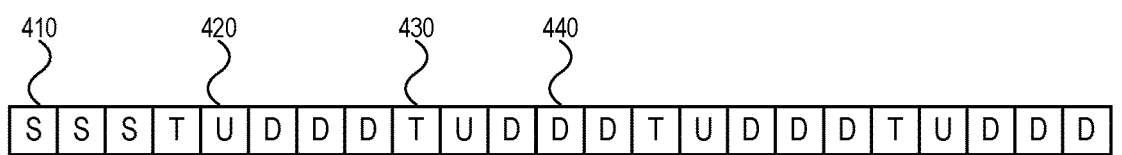
FIGS. 4A-4C respectively illustrate an exemplary TDD frame structure for wireless communication in accordance with various aspects of the present disclosure.

In FIG. 4A, a data frame is configured for bidirectional communication. The bidirectional data frame includes a plurality of SSB slots 410 (as illustrated, three) at the beginning thereof, followed by a transitional slot 430, followed by an uplink (UL) data slot 420, followed by three DL data slots 440. The pattern of one transitional slot 430, one UL data slot 420, and three DL data slots 440 repeats for the remainder of the frame. The frame may exist in a 100 MHZ bandwidth layer, such as a layer of band n41. Thus, the transmissions represented in FIG. 4A may occupy 272 PRBs of the transmitting access node.

Figure 4B:
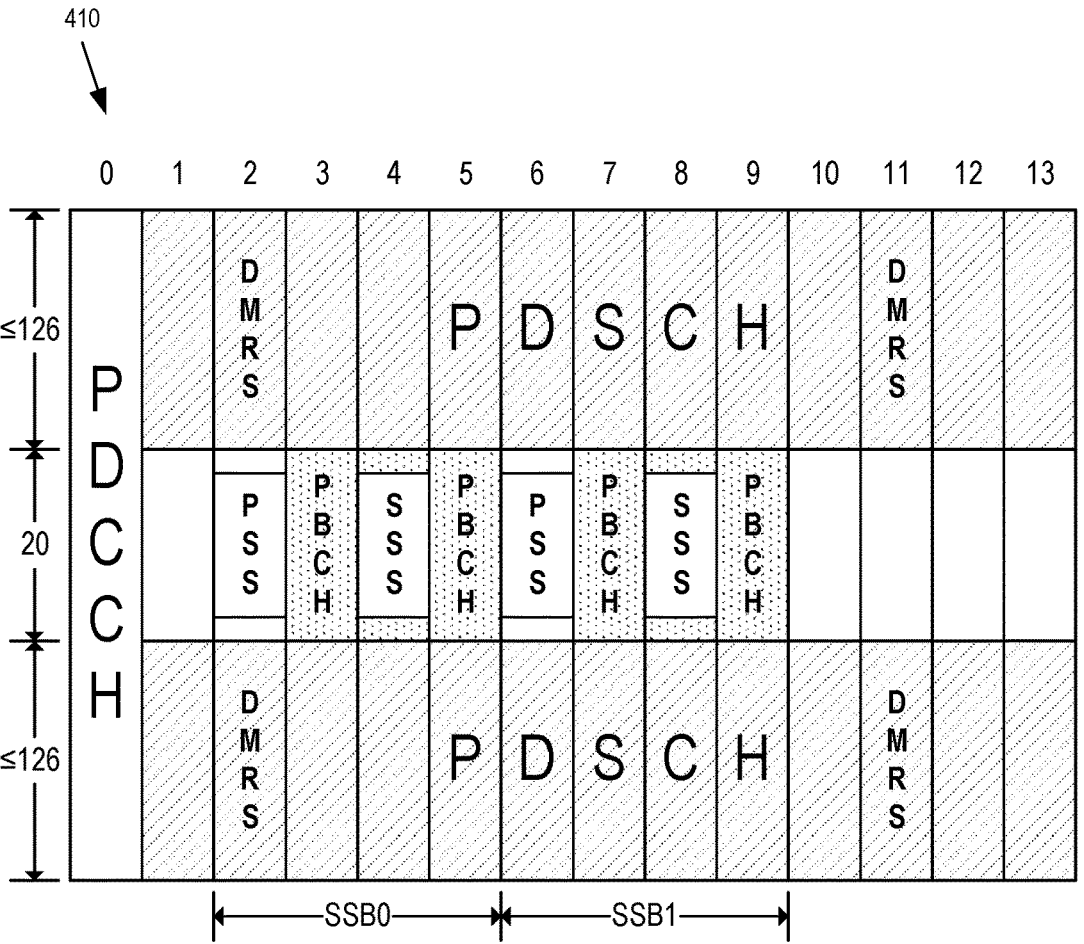
Figure 4C:
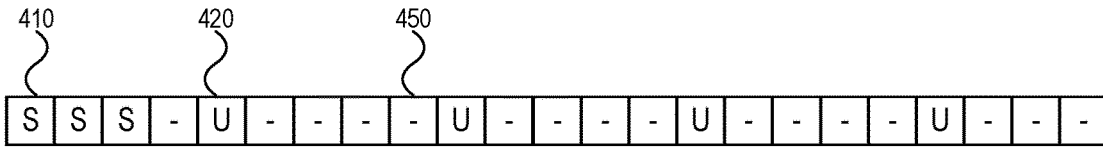

FIG. 4B illustrates the SSB slot 410 in more detail. The central 20 PRBs are used to transmit synchronization signals, and the 126 PRBs above and below the central 20 PRBs are used to transmit data (PDSCH) signals. As noted above, transmitting PDSCH signals in the SSB slot 410 provides an increase in throughput. In symbol 0, control information is transmitted in a Physical Downlink Control Channel (PDCCH) transmission. The SSB slot 410 includes two SSBs, each of which occupies four symbols in the time domain and 20 PRBs in the frequency domain. Each SSB includes a PSS in the first symbol (2 and 6) and an SSS in the third symbol (4 and 8), each of which occupy 12 PRBs in the frequency domain. Each SSB further includes a PBCH transmission spanning the second through fourth symbol (3-5 and 7-9), which occupies 20 PRBs in the second and fourth symbol and the remaining 8 PRBs (i.e., those PRBs not occupied by the SSS) in the third symbol. A total of 252 PRBs are available for data transmissions in symbols 1-13, which includes DMRS and PDSCH transmissions. In many instances when resource utilization is low, the space available for data transmissions in the SSB slots 410 (i.e., the 252 PRBs over 13 symbols in three different SSB slots 410) is sufficient to handle all data traffic for the access node. Thus, the access node may implement the systems and methods described in more detail below (see FIGS. 5-6) in order to schedule all data signals to be transmitted in the SSB slots 410 and not to be transmitted in any of the data slots 440. FIG. 4C illustrates the resulting frame in which the SSB slots 410 are followed by a series of blanked slots 430 in which no data is transmitted and the associated antennas may be powered down. The UL data slots 420 may remain active for UL data from connected wireless devices.

Figure 5:
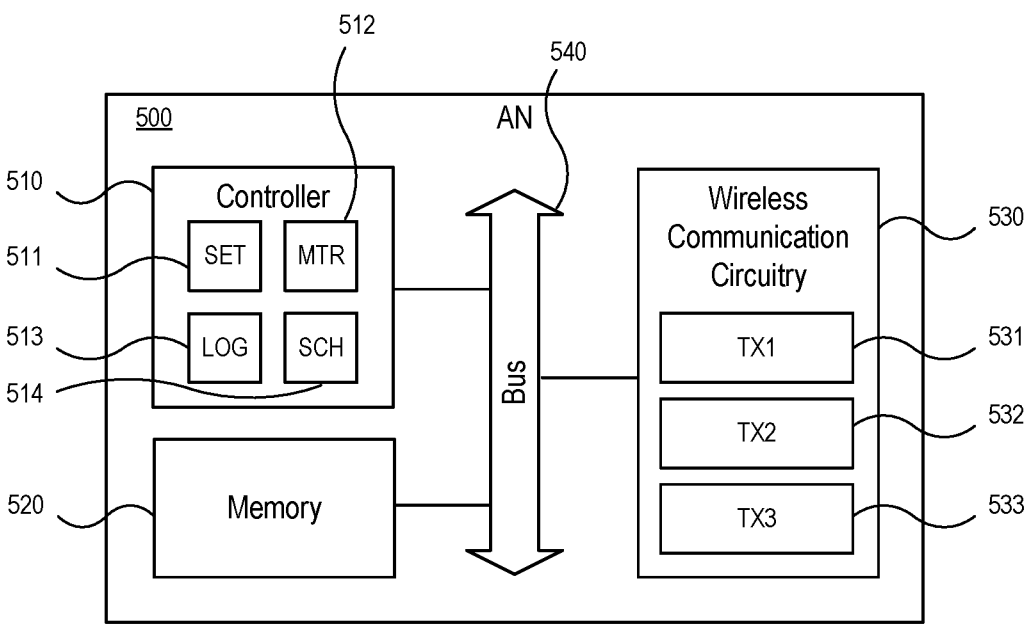
FIG. 5 illustrates an exemplary access node in accordance with various aspects of the present disclosure.

FIG. 5 illustrates one example of an access node 500, which may correspond to one or more of the access nodes 130 shown in FIG. 1 and/or the access node 230 shown in FIG. 2 and which may implement the data scheduling methods described herein. The access node 500 may be configured to communicate with a plurality of wireless devices using a wideband (e.g., a carrier or combination of carriers). As illustrated, the access node 500 includes a controller 510, a memory 520, wireless communication circuitry 530, and a bus 540 through which the various elements of the access node 500 communicate with one another. The controller 510 is one example of an electronic processor, and may include sub-modules or units, each of which may be implemented via dedicated hardware (e.g., circuitry), software modules which are loaded from the memory 520 and processed by the controller 510, firmware, and the like, or combinations thereof, thereby to implement operations and processes in accordance with the present disclosure. As illustrated, the controller 510 includes a setting module 511, a monitoring module 512, a logic module 513, and a scheduling module 514. Some or all of the sub-modules or units may physically reside within the controller 510, or may instead reside within the memory 520 and/or may be provided as separate units within the access node 500, in any combination. While FIG. 5 illustrates the setting module 511, the monitoring module 512, the logic module 513, and the scheduling module 514 as being separate modules, in practical implementations some of the modules may be combined with one another and/or may share components (e.g., logic gates).

The wireless communication circuitry 530 may include circuit elements configured for inbound communication to receive wireless signals (e.g. one or more antennas) as well as interface elements configured, for example, to translate data signals from wireless input into control or other signals for the controller 510. Moreover, the wireless communication circuitry 530 may include circuit elements configured for outbound communication to generate wireless signals (e.g., one or more antennas) as well as interface elements configured, for example, to translate control signals from the controller 510 into data signals for wireless output. Three such elements are expressly illustrated in FIG. 5: a first transmission antenna 531, a second transmission antenna 532, and a third transmission antenna 533. In practical implementations, the wireless communication circuitry 530 may include any number of transmission antennas and any of the transmission antennas may be either omnidirectional or directional in nature. The access node 500 may be configured to receive communications from one or more connected wireless devices via the wireless communication circuitry 530 and output communications and/or control signals or instructions to the wireless device via the wireless communication circuitry 530, thereby managing traffic and network resources. In an example, the wireless communication circuitry 530 is configured to communicate with connected wireless devices using a 5G RAT. The access node 500 may include additional wireless communication circuitry elements, for example to communicate using additional frequencies and/or to provide connectivity for different RATs. The access node 500 may further include additional wired communication circuitry elements.

Through the setting module 511, the monitoring module 512, the logic module 513, and the scheduling module 514, the access node 500 (e.g., the controller 510) may be configured to perform various operations to implement methods in accordance with the present disclosure, for example by controlling the operation of the wireless communication circuitry 530. While one example of operations performed by the modules is described here, in practical implementations at least some of the operations described as being performed by one module may instead be performed by another module, including a module not explicitly named here.

The setting module 511 may be configured to set at least one utilization threshold for the access node 500. The at least one utilization threshold may correspond to a threshold number of active wireless devices connected to the access node 500 (i.e., a user threshold), to a threshold PRB utilization of the access node 500 (i.e., a resource utilization threshold), or both. Respective ones of the at least one utilization threshold may be determined by a network operator and/or by an algorithm analyzing historical usage data (e.g., a machine learning (ML) or artificial intelligence (AI) algorithm). In such implementations, the ML or AI algorithm may reside in the access node 500 or in any other network entity. The ML or AI algorithm may be trained on one or more datasets including historical resource usage, traffic, latency, or other parameters related to a resource allocation of the network.

The monitoring module 512 may be configured to monitor at least one utilization parameter for the access node 500. The at least one utilization parameter may correspond in number and kind to the at least one utilization threshold; for example, the at least one utilization parameter may correspond to a number of active wireless devices connected to the access node 500 (i.e., a user parameter), to a PRB utilization of the access node 500 (i.e., a resource utilization parameter), or both. The value of the utilization parameter may be determined as an average over a predetermined time window, the length of which may be set or reset by a network operator. The monitoring module 512 may further be configured to monitor a time of day and/or to monitor an operating mode of the access node 500. For example, the monitoring module 512 may be configured to monitor the at least one utilization parameter only if a power saving mode is active for the access node 500 and/or only if the time of day corresponds to a time of low usage (e.g., in the middle of the night). The operations performed by the monitoring module 512 may be performed continuously or continually, such as at predetermined time intervals the length of which may be determined by a network operator.

The logic module 513 may be configured with various logic circuits or elements in order to various logic operations, including but not limited to operations of comparing, calculating, determining, and identifying various aspects of the network and/or the access node 500. In one example, the logic module 513 may be configured to compare a respective utilization threshold to a corresponding utilization parameter. The logic module 513 may additionally be configured to determine whether a power saving mode is active (e.g., by analyzing a flag or setting) and/or to determine whether a current time of day corresponds to a time of low usage or historically low usage. The logic module 513 may be configured to output the result of the determination(s); for example, logic module 513 may output a signal indicating whether a utilization parameter is above or below the corresponding utilization threshold, may output a signal to the monitoring module 512 indicating that a power saving mode is active or the time of day corresponds to a time of historically low usage, and so on.

The scheduling module 514 may be configured to determine the manner in which the access node 500 communicates with connected wireless devices, for example by controlling the timing at which DL transmissions occur. In one example, the scheduling module 514 may, in response to a determination that one or more utilization parameter is below the corresponding utilization threshold (e.g., by the logic module 513), cause the access node 500 to transmit data signals in an SSB slot of a DL transmission frame and to not transmit data signals in slots of the DL transmission frame other than the SSB slot. This may include causing the access node 500 to deactivate at least one transmission antenna 531-533. The deactivated transmission antenna may be a directional antenna, thus leaving at least one omnidirectional antenna of the wireless communication circuitry 530 active. The scheduling module 514 may further determine the length of time for which the transmission antenna is to be deactivated. For example, the scheduling module 514 may cause a particular transmission antenna to remain active during transmission of the SSB slot and then deactivate for the remainder of the frame.

After an initial scheduling has been performed, for example to prioritize data transmissions in the SSB slot, the monitoring module 512, the logic module 513, and the scheduling module 514 may be configured to perform operations that are the converse of those described above. For example, if the logic module 513 later determines that the at least one utilization parameter now exceeds the corresponding utilization threshold, the scheduling module 514 may stop prioritizing data transmissions in the SSB slot and return to standard (i.e., non-power-saving) operation. This may include causing the access node 500 to activate one or more of the deactivated transmission antennas 531-533.

While the above descriptions provides on example in which the setting module 511, the monitoring module 512, the logic module 513, and the switching module 514 are included in the access node 500, in other implementations one or more of the modules may be included in another network device or node. In such implementations, other network device or node may transmit an instruction to the access node 500 to initiate the scheduling operation.

Figure 6:
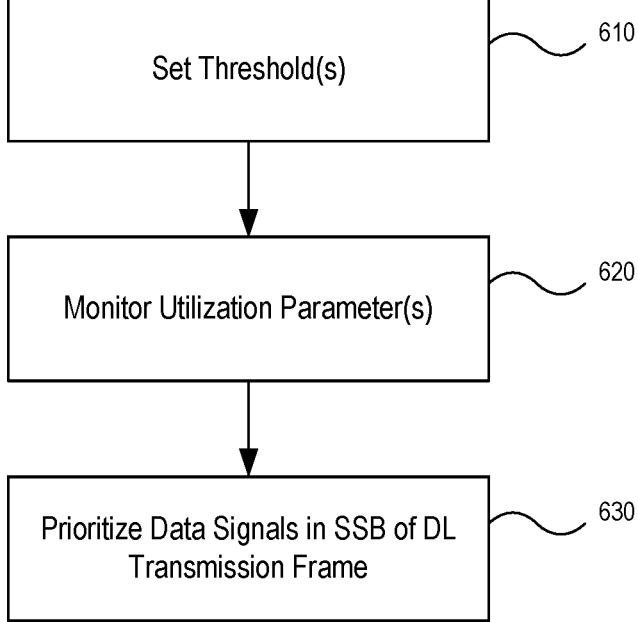
FIG. 6 illustrates an exemplary process flow for scheduling transmissions in accordance with various aspects of the present disclosure.

FIG. 6 illustrates an exemplary process flow for scheduling network transmissions (i.e., for prioritizing data transmissions in an SSB slot). The operations of FIG. 6 will be described as being performed by the access node 500 (e.g., by the controller thereof) in communication with at least one wireless device for purposes of explanation. In other implementations, the operations may be performed by or under the control of a processing node external to the access node 500.

The process flow begins at operation 610 with setting at least one utilization threshold. The utilization threshold may correspond to a threshold number of active wireless devices connected to the access node 500 (i.e., a user threshold), to a threshold PRB utilization of the access node 500 (i.e., a resource utilization threshold), or both. Respective ones of the at least one utilization threshold may be determined by a network operator and/or by an algorithm analyzing historical usage data (e.g., a machine learning (ML) or artificial intelligence (AI) algorithm). In such implementations, the ML or AI algorithm may reside in the access node 500 or in any other network entity. The ML or AI algorithm may be trained on one or more datasets including historical resource usage, traffic, latency, or other parameters related to a resource allocation of the network.

At operation 620, the process flow monitors at least one utilization parameter for the access node 500. The at least one utilization parameter may correspond in number and kind to the at least one utilization threshold; for example, the at least one utilization parameter may correspond to a number of active wireless devices connected to the access node 500 (i.e., a user parameter), to a PRB utilization of the access node 500 (i.e., a resource utilization parameter), or both. The value of the utilization parameter may be determined as an average over a predetermined time window, the length of which may be set or reset by a network operator. Operation 620 may further include monitoring a time of day and/or monitoring an operating mode of the access node 500. For example, the monitoring of the at least one utilization parameter may be performed only if a power saving mode is active for the access node 500 and/or only if the time of day corresponds to a time of low usage (e.g., in the middle of the night). The monitoring sub-operations within operation 620 may be performed continuously or continually, such as at predetermined time intervals the length of which may be determined by a network operator.

Operation 620 may include various logic operations, including but not limited to operations of comparing, calculating, determining, and identifying various aspects of the network and/or the access node 500. In one example, operation 620 includes logical operations of comparing a respective utilization threshold to a corresponding utilization parameter. Operation 620 may further include determining whether a power saving mode is active (e.g., by analyzing a flag or setting) and/or determining whether a current time of day corresponds to a time of historically low usage (e.g., comparatively low usage over a period of time set by a network operator). Operation 620 may furthering include outputting the result of the determination(s); for example, outputting a signal indicative of whether a utilization parameter is above or below the corresponding utilization threshold, outputting a signal indicative of whether a power saving mode is active or the time of day corresponds to a time of historically low usage, and so on.

In response to a determination that the communication parameter is below the communication threshold and based on the resource status, at operation 630 the process flow causes the access node 500 to transmit data signals in an SSB slot of a DL transmission frame and not to transmit data signals in slots of the DL transmission frame other than the SSB slot. This may include causing the access node 500 to deactivate at least one transmission antenna 531-533. The deactivated transmission antenna may be a directional antenna, thus leaving at least one omnidirectional antenna of the wireless communication circuitry 530 active. Operation 630 may further include determining the length of time for which the transmission antenna is to be deactivated and instructing the access node 500 accordingly. For example, operation 630 may include causing a particular transmission antenna to remain active during transmission of the SSB slot and then deactivate for the remainder of the frame After an initial scheduling has been performed, for example to prioritize data transmissions in the SSB slot, the process flow may continue and perform operations that are the converse of those described above. For example, if it is later determined (e.g., at the converse of operation 620) that the at least one utilization parameter now exceeds the corresponding utilization threshold, further scheduling may be performed (e.g., at the converse of operation 630) to stop prioritizing data transmissions in the SSB slot and return to standard (i.e., non-power-saving) operation. This may include causing the access node 500 to activate one or more of the deactivated transmission antennas 531-533.

The operations of FIG. 6 need not necessarily be performed one after another in immediate sequence. For example, operation 610 may be performed in advance, for example during a network configuration operation and/or during startup of the access node 300. Subsequently, operation 620 may be performed continuously or continually until operation 620 determines that the utilization parameter is below the utilization threshold, at which point operation 630 may occur. Subsequently, the converse of operation 620 may again be performed continuously or continually until it is determined that another scheduling change operation should occur, and so on.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of scheduling network transmissions, comprising:

setting a utilization threshold for an access node;

monitoring a utilization parameter for the access node, wherein the utilization parameter corresponds to a physical resource block (PRB) utilization of the access node; and in response to a determination that the utilization parameter is below the utilization threshold, causing the access node to transmit data signals in a synchronization signal block slot of a downlink transmission frame and to not transmit data signals in slots of the downlink transmission frame other than the synchronization signal block slot.

2. The method according to claim 1, wherein the utilization parameter further corresponds to a number of active wireless devices connected to the access node.

3. The method according to claim 1, wherein causing the access node to not transmit data signals in the slots of the downlink transmission frame other than the synchronization signal block slot includes deactivating at least one antenna of the access node.

4. The method according to claim 3, wherein the at least one deactivated antenna is at least one directional antenna.

5. The method according to claim 1, further comprising:

determining whether a power saving mode is active for the access node, wherein monitoring the utilization parameter for the access node occurs only in response to a determination that the power saving mode is active for the access node.

6. The method according to claim 5, wherein determining whether the power saving mode is active for the access node includes determining a time of day.

7. The method according to claim 1, wherein the utilization threshold is determined by a network operator.

8. A system for scheduling network transmissions, comprising:

an access node; and at least one electronic processor operatively connected to the access node and configured to perform operations including:

in response to a determination that a power saving mode is active for the access node, monitoring a utilization parameter for the access node, wherein the utilization parameter corresponds to a physical resource block (PRB) utilization of the access node, and in response to a determination that the utilization parameter is below a utilization threshold, causing the access node to transmit data signals in a synchronization signal block slot of a downlink transmission frame and to not transmit data signals in slots of the downlink transmission frame other than the synchronization signal block slot.

9. The system according to claim 8, wherein the utilization parameter further corresponds to a number of active wireless devices connected to the access node.

10. The system according to claim 8, wherein causing the access node to not transmit data signals in the slots of the downlink transmission frame other than the synchronization signal block slot includes deactivating at least one antenna of the access node.

11. The system according to claim 8, wherein determining that the power saving mode is active for the access node includes determining that a current time corresponds to a time of historically low usage.

12. A non-transitory computer-readable medium storing instructions that, when executed by a processor of a processing node, cause the processing node to perform operations comprising:

setting a user threshold and a resource utilization threshold for an access node;

monitoring a user parameter and a resource utilization parameter for the access node; and in response to one or both of a determination that the user parameter is below the user threshold and a determination that the resource utilization parameter is below the resource utilization threshold, causing the access node to transmit data signals in a synchronization signal block slot of a downlink transmission frame and to not transmit data signals in slots of the downlink transmission frame other than the synchronization signal block slot.

13. The non-transitory computer-readable medium according to claim 12, wherein causing the access node to not transmit data signals in the slots of the downlink transmission frame other than the synchronization signal block slot includes deactivating at least one antenna of the access node.

14. The non-transitory computer-readable medium according to claim 12, the operations further comprising:

determining whether a power saving mode is active for the access node, wherein monitoring the user parameter and the resource utilization parameter for the access node occurs only in response to a determination that the power saving mode is active for the access node.

15. The non-transitory computer-readable medium according to claim 12, wherein determining whether the power saving mode is active for the access node includes determining a time of day.

16. The non-transitory computer-readable medium according to claim 12, wherein determining whether the power saving mode is active for the access node includes determining whether a power saving mode flag has been set by a network operator.

17. The non-transitory computer-readable medium according to claim 12, wherein one or both of the user threshold or the resource utilization threshold is determined by a network operator.

18. The non-transitory computer-readable medium according to claim 12, wherein one or both of the user threshold or the resource utilization threshold is determined by an algorithm analyzing historical usage data.

* * * * *